United States Patent Office 2,729,654
Patented Jan. 3, 1956

2,729,654

10-HYDROXY-3-KETOSTEROIDS

Frank B. Colton, Chicago, Ill., assignor to G. D. Searle & Co., Chicago, Ill., a corporation of Illinois No Drawing. Application May 19, 1954,
Serial No. 430,977

4 Claims. (Cl. 260—397.4)

My invention relates to a new group of 10-hydroxy-3-ketosteroids and, more specifically, to 10-hydroxy-4-estren-3-ones substituted in the 17-position by a member of the class consisting of oxo, hydroxy, and acetyl radicals. The compounds of my invention can be represented by the general structural formula

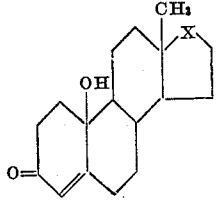

wherein X represents a member of the class consisting of carbinol, carbonyl, and >CH—CO—CH₃ radicals.

The compounds of my invention have valuable cardio-regulatory, androgenic, and anabolic properties and act as local anesthetics. They are also valuable as intermediates in the organic synthesis of other valuable compounds. Thus, perfusion through surviving mammalian adrenal glands causes introduction of an 11β-hydroxy group. The resulting 10,11-dihydroxy compounds have valuable adrenocorticoid properties. The 11β-hydroxy group can be oxidized with chromic acid to yield the 11-oxo compounds. Other nuclear hydroxy groups can be introduced by microbiological oxidation with organisms of the Curvularia, Penicillium, Streptomyces, Aspergillus, and Mucorales type. The 10-hydroxy steroids can also be converted to the corresponding 10-halosteroids.

The compounds of my invention are conveniently synthesized by the treatment of a 5(10)-estren-3-one of the structural formula

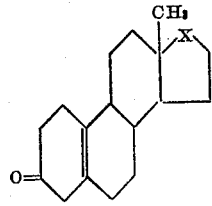

with perbenzoic acid in an inert organic solvent such as a lower aromatic hydrocarbon, e. g. benzene, toluene and xylene. As an intermediate there is formed the 5,10-epoxyestren-3-one of the structural formula

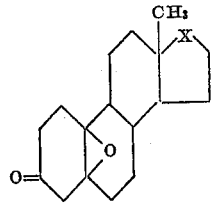

which can be isolated, if desired, and then converted to the 10-hydroxy-4-estren-3-one by treatment with alkali.

The following examples illustrate in further detail the compounds which constitute this invention and the methods for their synthesis. However, the invention is not to be construed as limited in spirit or in scope by the details set forth therein. It will be apparent to those skilled in the art that numerous modifications in materials and methods can be practiced without departing from the invention. In these examples quantities are indicated as parts by weight.

Example 1

To a refluxing solution of 20 parts of the methyl ether of 1,4-dihydroestrone in 850 parts of methanol are added 53 parts of glacial acetic acid. Refluxing is continued for 10 minutes. Then water is added slowly until the reaction mixture becomes turbid. After storing at 0° C. the precipitate is collected on a filter, vacuum dried and recrystallized from a mixture of ethyl acetate and petroleum ether. The 5(10)-estrene-3,17-dione thus obtained can be further purified by chromatography on a silica gel column. Elution with a 5% solution of ethyl acetate in benzene and evaporation of the eluate yields a residue which, recrystallized from ethyl acetate and petroleum ether, melts at about 144–146° C.

To a solution of 527 parts of 5(10)-estrene-3,17-dione in 4400 parts of benzene are added 49,600 parts of an 0.21-N solution of perbenzoic acid in benzene. The reaction mixture is permitted to stand at room temperature for 50 minutes and then diluted with 100,000 parts of benzene. The resulting solution is washed with 5% aqueous sodium carbonate and then with water, dried over anhydrous sodium sulfate and evaporated under vacuum. The crystalline residue contains a mixture of two isomers of 10-hydroxyestrene-3,17-dione. The 10α-hydroxy and 10β-hydroxy forms apparently are both present. Repeated crystallization from ethyl acetate and petroleum ether yields crystals melting at about 207–209° C. The optical rotation of an 0.725% chloroform solution $\alpha_D^{25}$ is +151°. The ultraviolet absorption spectrum of a methanolic solution shows a maximum at 234 millimicrons with a molecular extinction coefficient of 14,800. The crystallization mother liquors are permitted to stand at room temperature for 2 days. The resulting precipitate is repeatedly recrystallized from ethyl acetate and petroleum ether. There is thus obtained an isomer of 10-hydroxy-4-estrene-3,17-dione which melts at about 172° C., resolidifies and remelts at about 186–188° C. The optical rotation of a 1% chloroform solution $\alpha_D^{25} = -124°$. The compound has the structural formula

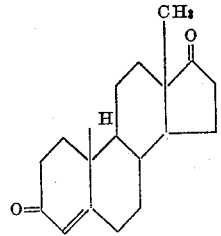

Example 2

A solution of 9 parts of 17β-hydroxy-5(10)-estren-3-one in 310 parts of benzene is treated with 197 parts of an 0.32-N solution of perbenzoic acid in benzene. According to ultraviolet evidence, the reaction appears to be 90% completed after 10 minutes. The mixture is allowed to stand for an additional twenty minutes. More benzene is added and the reaction mixture is washed with 5% sodium bicarbonate solution and water, dried over anhydrous sodium sulfate and evaporated under vacuum. The residue is crystallized from ethyl acetate in petroleum ether and then repeatedly from acetone. There is thus obtained 17β-hydroxy-5,10-epoxyestran-3-one, which melts at about 198.5–200.5° C. The rotation of a 1% chloroform solution $\alpha_D^{25}$ is −39°.

To a solution of 1 part of this epoxide in 32 parts of methanol are added 5.5 parts of 4-N aqueous sodium hydroxide solution. The mixture is permitted to stand at room temperature for an hour after which it is diluted with water and extracted with ethyl acetate. The extract is washed with saturated sodium chloride solution and then with water, dried over anhydrous calcium sulfate, filtered and evaporated to yield a mixture of 2 isomers of 10,17β-hydroxy-4-estren-3-one. Further purification can be achieved by chromatography on silica gel and elution with successively increasing proportions of ethyl acetate in benzene solution. The ultraviolet absorption spectrum of both isomers shows maxima at 234 millimicrons with a molecular extinction coefficient of about 15,000. Infrared maxima are observed at 2.88 and 5.98 microns in CHCl₃. The compound has the structural formula

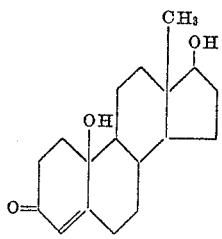

*Example 3*

An anhydrous solution of 10 parts of 3-methoxy-17β-(α-hydroxyethyl)-2,5(10)-estradiene (prepared by the method of Djerassi, Jour. Am. Chem. Soc., vol. 75, page 4440; 1953), 5 parts of aluminum isopropylate and 83 parts of cyclohexanone in 450 parts of toluene is heated at reflux temperature for 3 hours and then treated with water and 90 parts of a saturated Rochelle salt solution. The mixture is then steam distilled for 45 minutes. The solid residue is collected on a filter, dried and recrystallized from a mixture of ether and petroleum ether.

To a refluxing solution of 10 parts of the 3-methoxy-17β-acetyl-2,5(10)-estradiene thus obtained in 500 parts of methanol are added 50 parts of glacial acetic acid. Refluxing is continued for 15 minutes after which water is slowly added to the point of turbidity. The reaction mixture is stored at 0° C. until the 17β-acetyl-5(10)-estren-3-one precipitates. The precipitate is collected on a filter, dried under vacuum and crystallized from ethyl acetate in petroleum ether. It can be further purified by chromatography on a silica gel column.

To a solution of 16 parts of this product in 500 parts of benzene are added 396 parts of an 0.2-N solution of perbenzoic in benzene. The reaction mixture is permitted to stand at room temperature for an hour after which it is diluted with benzene and washed with aqueous sodium carbonate and water. Then the solution is dried over anhydrous calcium sulfate, filtered and freed from solvent by vacuum distillation. The residue contains the crystalline mixture of 2 isomers of 10-hydroxy-17β-acetyl-4-estren-3-one which has the structural formula

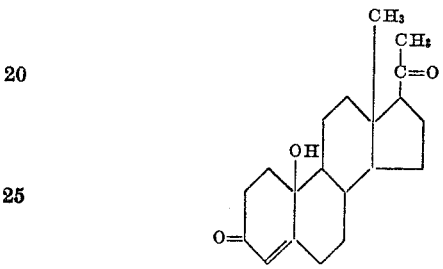

The ultraviolet absorption spectrum shows a maximum at 234 millimicrons with a molecular extinction coefficient of 14,500. Infrared maxima are observed at 2.9, 6.0, and 5.9 microns.

I claim:
1. 10-hydroxy-4-estren-3-one substituted in the 17-position by a member of the class consisting of oxo, hydroxy and acetyl radicals.
2. 10-hydroxy-4-estrene-3,17-dione.
3. 10,17-dihydroxy-4-estren-3-one.
4. 10-hydroxy-17β-acetyl-4-estren-3-one.

References Cited in the file of this patent
UNITED STATES PATENTS

| | | |
|---|---|---|
| 2,530,817 | Ehrenstein | Nov. 21, 1950 |
| 2,655,518 | Colton | Oct. 13, 1953 |
| 2,683,725 | Murray | July 13, 1954 |